United States Patent
Imai (10) Patent No.: US 8,154,762 B2
(45) Date of Patent: Apr. 10, 2012

(54) IMAGE FORMING APPARATUS AND METHOD OF CONTROLLING SAME

(75) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 11/971,257

(22) Filed: Jan. 9, 2008

(65) Prior Publication Data

US 2008/0170278 A1 Jul. 17, 2008

(30) Foreign Application Priority Data

Jan. 12, 2007 (JP) .................................. 2007-005080

(51) Int. Cl.
*H04N 1/60* (2006.01)

(52) U.S. Cl. ......... 358/1.9; 358/518; 358/520; 358/521; 382/162; 382/167

(58) Field of Classification Search .......... 358/1.9–3.24, 358/515–522
See application file for complete search history.

(56) References Cited

U.S. PATENT DOCUMENTS

| | | | | |
|---|---|---|---|---|
| 5,537,228 A | * | 7/1996 | Dillinger | 358/502 |
| 7,564,604 B2 | * | 7/2009 | Shirasawa | 358/529 |
| 7,583,407 B2 | * | 9/2009 | Imai | 358/1.9 |
| 7,612,813 B2 | * | 11/2009 | Hunter | 348/297 |
| 7,952,757 B2 | * | 5/2011 | Kaneko et al. | 358/1.9 |
| 2004/0263456 A1 | * | 12/2004 | Miyachi et al. | 345/88 |
| 2005/0052671 A1 | * | 3/2005 | Nishikawa | 358/1.9 |
| 2007/0046960 A1 | | 3/2007 | Imai | 358/1.9 |

FOREIGN PATENT DOCUMENTS

| | | |
|---|---|---|
| JP | 2001-136401 | 1/2001 |
| JP | 2003-011432 | 5/2003 |

\* cited by examiner

*Primary Examiner* — King Poon
*Assistant Examiner* — Richard Zhu
(74) *Attorney, Agent, or Firm* — Fitzpatrick, Cella, Harper & Scinto (57) ABSTRACT

In order to enlarge a gamut in the low-brightness region of the hue of a special color, an image forming apparatus comprises an input unit for inputting color image data for which an image is to be formed; a color separation unit for generating color data in which the color image data has been separated into each of the plurality of colors; and an image forming unit for forming a color image based upon the color data; wherein said color separation unit generates the color data so that the color data has a region in which amount of the color material of the color black used is increased and amount of the color material of the special color used is increased as brightness declines in a low-brightness region in the hue of the special color.

8 Claims, 9 Drawing Sheets

IMAGE FORMING APPARATUS AND METHOD OF CONTROLLING SAME

BACKGROUND OF THE INVENTION

1. Field of the Invention

The present invention relates to an image forming technique using printing materials (color materials) of a plurality of colors inclusive of a special color.

2. Description of the Related Art

In a case where the printing materials used in a printing apparatus are inks or toners of the colors cyan (C), magenta (M), yellow (Y) and black (K), for example, image processing for generating print data applies color separation to RGB image data to separate the data into C, M, Y, K data corresponding to the respective printing materials. Color separation usually is carried out using a look-up table (LUT). In other words, the LUT defines a method of generating C, M, Y, K data indicating how printing materials are to be combined for a combination of items of R, G, B data.

Furthermore, there are cases where use is made of a special color for the purpose of enlarging the gamut that can be reproduced by a printing apparatus, e.g., for the purpose of reproducing a higher saturation, as a printing technique employed in a printing apparatus using ink or toner. That is, there are cases where in addition to the usually used C, M, Y (so-called "basic colors") and K, use is made of printing materials of the colors red, orange, green, blue and violet as the special colors.

As a printing technique using such a special color, the specification of Japanese Patent Laid-Open No. 2001-136401 (Patent Document 1) proposes a technique for performing color separation by dividing a gamut into sub-gamuts that are based upon a combination of the color K and three chromatic colors and then extracting a combination of colors from each sub-gamut.

Further, the specification of Japanese Patent Laid-Open No. 2003-011432 (Patent Document 2) proposes a technique for performing color separation using both a special color and basic colors in a case where, in terms of the hue of a special color, saturation falls below that of the combination of basic colors in a certain brightness region when only a special color is used. Specifically, in a case where use is made of, e.g., green ink having a high brightness, the gamut is enlarged in a low-brightness portion of the hue of green by using a combination of cyan and yellow.

All of such conventional printing techniques can enlarge the gamut of a high-brightness, high-saturation region by performing a color separation in which a special color and other color materials are combined appropriately.

In the technique described in Patent Document 1, however, since a combination of colors is extracted from a sub-gamut of a combination of four colors, the combination is less than four colors and is limited to a combination that was defined at creation of the sub-gamut. A problem, therefore, is that it is impossible to obtain optimum color separation with regard to all gamuts.

Further, in the technique described in Patent Document 2, if a color material of a special color having a high brightness is used, a problem is that the gamut cannot be enlarged satisfactorily in a low-brightness region or in the vicinity of black.

SUMMARY OF THE INVENTION

Accordingly, the present invention has been devised in view of the aforementioned problems and seeks to solve one or more of these problems.

According to one aspect of the present invention, an image forming apparatus for forming a color image using color materials of a plurality of colors that include a basic color, black and at least one special color, comprises: an input unit for inputting color image data for which an image is to be formed; a color separation unit for generating color data in which the color image data has been separated into each of the plurality of colors; and an image forming unit for forming a color image based upon the color data; wherein the color separation unit generates the color data so that the color data has a region in which amount of the color material of the color black used is increased and amount of the color material of the special color used is increased as brightness declines in a low-brightness region in the hue of the special color.

According to another aspect of the present invention, a method of controlling an image forming apparatus for forming a color image using color materials of a plurality of colors that include a basic color, black and at least one special color, the method comprises: an input step of an input unit inputting color image data for which an image is to be formed; a color separating step of a color separation unit generating color data in which the color image data has been separated into each of the plurality of colors; and an image forming unit of an image forming unit forming a color image based upon the color data; wherein the color data is generated at the color separation step so that the color data has a region in which amount of the color material of the color black used is increased and amount of the color material of the special color used is increased as brightness declines in a low-brightness region of the hue of the special color.

In accordance with the present invention, there is provided an image forming apparatus for forming a color image using a plurality of color materials that include the basic colors, black and at least one special color, wherein a reproducible gamut is enlarged satisfactorily even in low-brightness regions.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE EMBODIMENTS

The present invention will now be described in detail based upon a preferred embodiment thereof with reference to the accompanying drawings. It should be noted that the arrangement illustrated in the following embodiment is merely one embodiment and that the present invention is not limited to the illustrated arrangement.

[First Embodiment]
Overview of Printing System

Figure 1:
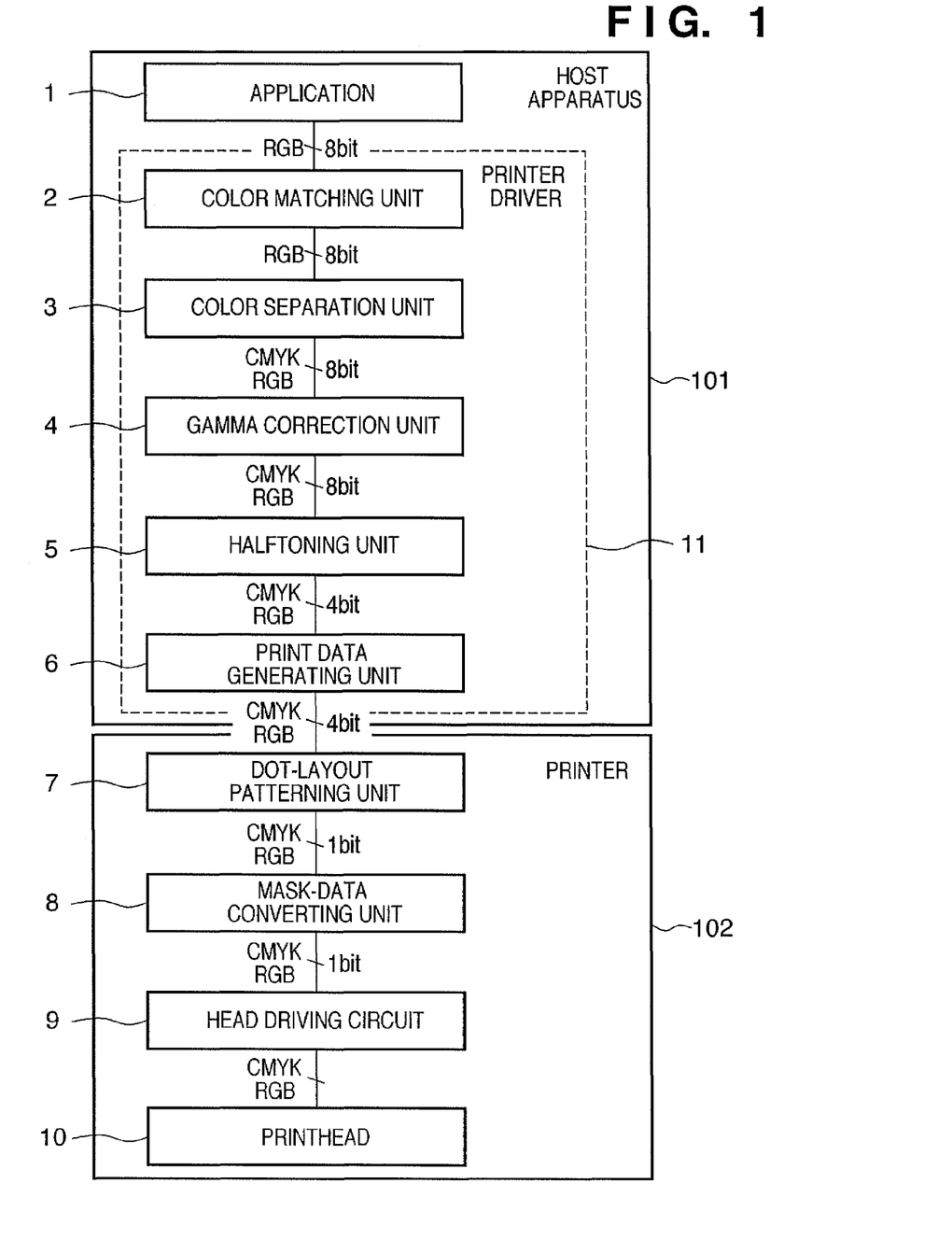
FIG. 1 is a block diagram illustrating an example of the configuration of a printing system according to a first embodiment of the present invention.

FIG. 1 is a block diagram illustrating an example of the configuration of a printing system to which this embodiment is applied. This system includes a printer 102, which is an ink-jet printer that uses a special color ink, and a host apparatus (computer or image processing apparatus) 101. The printer 102 performs printing using inks of a total of seven colors, namely inks of the colors cyan (C), magenta (M) and yellow (Y) and inks of the special colors red (R), green (G) and blue (B). A printhead 10 for discharging the inks of these seven colors, therefore, is provided.

Processing in the host apparatus 101 will be described first. An application program 1 and printer driver 11 operate in the operating system of the host apparatus 101. The application program 1 creates and edits image data to be printed by the printer 102.

It is possible for image data to be input to the host apparatus 101 via various media. For example, JPEG-format image data captured by a digital camera may be input via a memory card, or TIFF-format image data read by a scanner or image data that has been recorded on a CD-ROM may be input. Naturally, it is also possible to input image data that has been downloaded from a server or website disposed on a network such as the Internet.

The host apparatus 101 displays the entered image data on a monitor (not shown), and the user of the host apparatus 101 subjects the image data to editing and manipulation by the application program 1 while referring to the monitor display, and specifies that the resulting image data is to be printed. In accordance with this print command, the application program 1 (or operating system) converts the image data to image data (eight bits per color) of a gamut according to, e.g., the sRGB standard, and delivers the resulting image data to the printer driver 11.

Using a color matching unit 2, the printer driver 11 applies gamut mapping processing to the entered image data. That is, RGB data of an sRGB gamut is converted to RGB data of a printer gamut by a three-dimensional LUT (3D-LUT), which indicates the relationship between a gamut reproduced by sRGB-compliant image data and a gamut reproducible by the printer 102 (namely the printer gamut), and an interpolation operation.

Next, a color separation unit 3 obtains color-separation data (eight bits per C, M, Y, K, R, G, B) corresponding to a combination of inks that reproduce a color represented by the gamut-mapped RGB data. This color separation processing is executed conjointly with a 3D-LUT and interpolation operation in a manner similar to the above-described gamut mapping processing. The details of color separation processing will be described later.

Next, for every color of color-separation data obtained by the color separation unit 3, a gamma correction unit 4 performs a gamma correction for converting a gray-level value. More specifically, using a one-dimensional LUT (1D-LUT) that conforms to the grayscale characteristic of each color ink used in the printer 102, the color separation unit 3 performs a conversion that correlates the color-separation data with the grayscale characteristic of the printer 102.

A halftoning unit 5 performs so-called quantization for converting each of the 8-bit items of color-separation data C, M, Y, K, R, G, B of to 4-bit values using the error diffusion method. Reference is had to this 4-bit data as an index for indicating the dot layout pattern in the printer 102.

A print data generating unit 6 generates print data obtained by adding print control information to the 4-bit index data.

Processing relating to the application program 1 and printer driver 11 is implemented by having a CPU (not shown) execute these programs. The programs are executed by being loaded into a RAM from a ROM or hard disk, neither of which are shown. At execution of the programs, the RAM is used as the work area of the CPU.

Next, the processing executed in the printer 102 will be described. The printer 102 applies dot-layout patterning processing and mask-data conversion processing to print data that enters from the host apparatus 101.

First, for every pixel of the actual print image, a dot-layout patterning unit 7 places a dot in accordance with a dot layout pattern corresponding to 4-bit index data (gray-level value information). In other words, assigned to each pixel expressed by 4-bit data is a dot layout pattern corresponding to the gray-level value of this pixel, ON/OFF of respective dots are defined with regard to a plurality of areas within the pixel and "1" or "0" ink discharge data is laid out for each area.

A mask-data converting unit 8 applies mask processing to the above-mentioned 1-bit ink discharge data. That is, printing is performed in a scan area of a prescribed width (referred to as a "band" below) in the sub-scan direction of the printhead 10. Discharge data of each scan for completing this printing by performing scanning a plurality of times is generated by processing using a mask corresponding to each scan.

The scan-by-scan ink discharge data C, M, Y, K, R, G, B generated by the mask-data converting unit 8 is applied to a head driving circuit 9 at an appropriate timing. The head driving circuit 9 drives the printhead 10 in such a manner that each ink is discharged in accordance with the ink discharge data.

It should be noted that the above-described dot-layout patterning processing and mask-data conversion processing in the printer 102 is executed by a dedicated hardware circuit under the control of the CPU constituting the controller of the printer 102. Furthermore, the CPU of the printer 102 may execute the above-mentioned processing in accordance with a program or, e.g., the printer driver 11 of the host apparatus 101 may execute the processing. The host apparatus 101 of this embodiment shown in FIG. 1 is not limited to a computer, and it is possible to so arrange it that each process of the host apparatus 101 is executed in, e.g., the printer 102.

It is preferred that the special color inks of R, G, B used in printer 102 be capable of expressing a saturation and brightness greater than that of a secondary color created as a 2-color color mixture of the basic colors C, M, Y of inks. However, it will suffice if at least brightness can be made greater than that of the secondary color. That is, a "special color" ideal for this embodiment is a color that has a higher brightness than that of a gamut expressed on a print medium by a combination of any two printing materials of the basic colors C, M, Y, and indicates the hue within this gamut. Furthermore, it is even more desirable if the color is a color that is capable of expressing a saturation higher than that of this gamut. For example, it is preferred that the brightness and saturation capable of being expressed on a printing medium by a printing material of the special color G be greater than the brightness and saturation capable of being expressed on the printing medium by a combination of printing materials of the basic colors C, Y, which are colors that are adjacent to the color G. It should be noted that "adjacent colors" are the colors of color materials having the nearest hues on both sides of the hue of interest. However, hues regarded as being identical to the hue of interest are not included in adjacent colors, as in the manner of light cyan with respect to dark cyan.

Further, in this embodiment, the invention is described taking as an example an ink-jet printer using ink as the printing material. However, this embodiment is similarly applicable even to a printer or copier, etc., that use a printing material of another form, such as toner.

Furthermore, in this embodiment, the term "pixel" indicates the smallest unit for which a gray level is capable of being expressed. It is the smallest unit that can be subjected to processing such as image processing of multivalued data and the above-mentioned color-matching processing, color-separation processing, gamma correction and halftoning. Further, one pixel in the dot-layout patterning unit 7 corresponds to a pattern of 2×4 blocks, and each block in this one pixel is referred to as an "area". This area is the minimum unit in which ON/OFF of a dot can be defined. In relation to this, "image data" in color matching processing, color-separation processing and gamma correction represents a collection of pixels that are to undergo processing, and each pixel is data having, e.g., an 8-bit gray-level value. Further, "pixel data" in halftoning processing represents the pixel data per se to be processed. The above-mentioned 8-bit pixel data is converted by halftoning to pixel data (index data) having a 4-bit gray-level value.

Color-Separation Processing

Color-separation processing executed by the color separation unit 3 in the printer driver 11 of the host apparatus 101 will now be described in detail.

Figure 2:
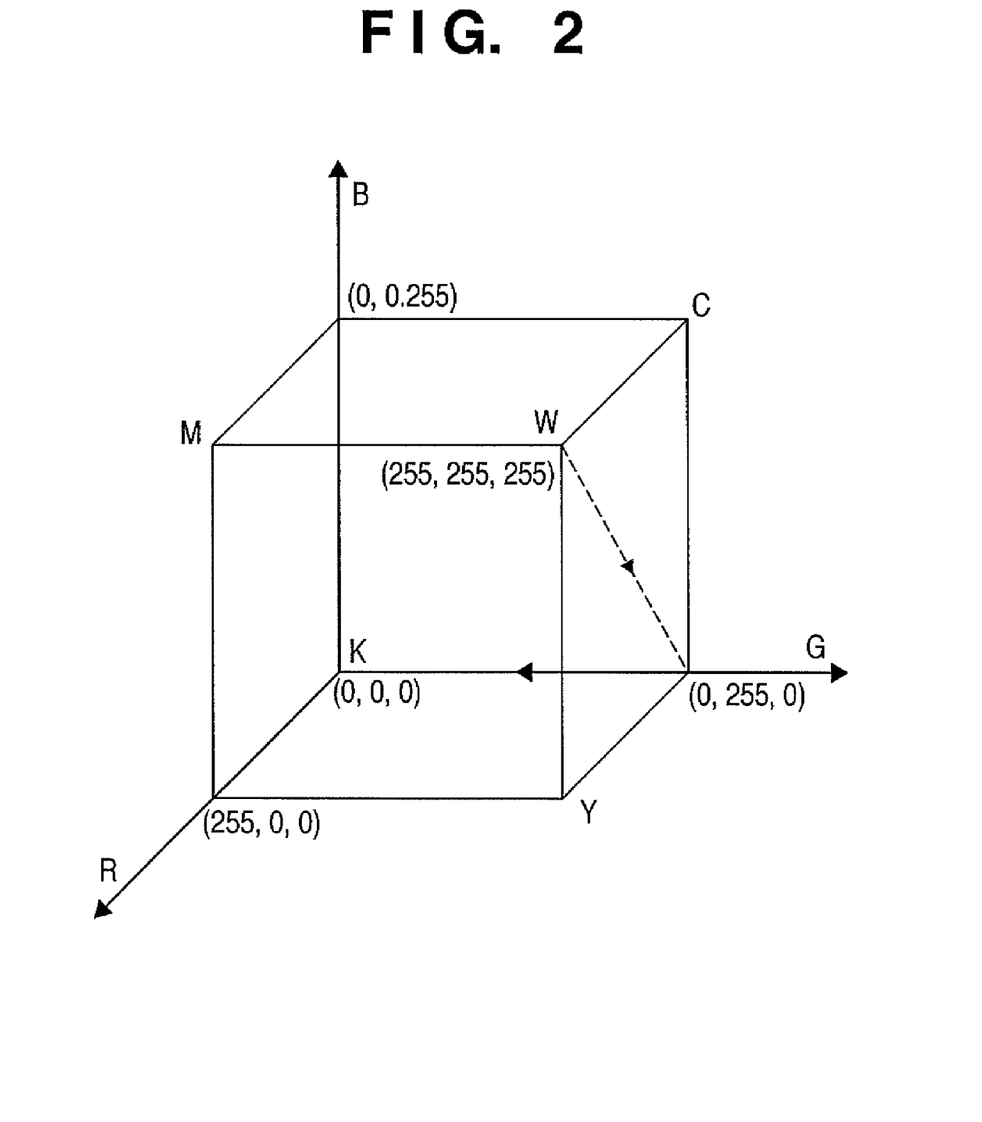
FIG. 2 is a diagram illustrating the concept of a 3D-LUT used in color separation processing of the first embodiment.

FIG. 2 is a diagram illustrating the concept of a 3D-LUT referred to in the color separation unit 3. The 3D-LUT is adapted so as to slice RGB space. In the color separation unit 3, CMYKRGB data at a lattice point with respect to an input RGB value in the 3D-LUT shown in FIG. 2 is read out and subjected to interpolation processing, whereby the input RGB data is converted to CMYKRGB color-separation data. In other words, FIG. 2 illustrates part of a 3D-LUT for converting RGB data to CMYKRGB data.

Figure 3:
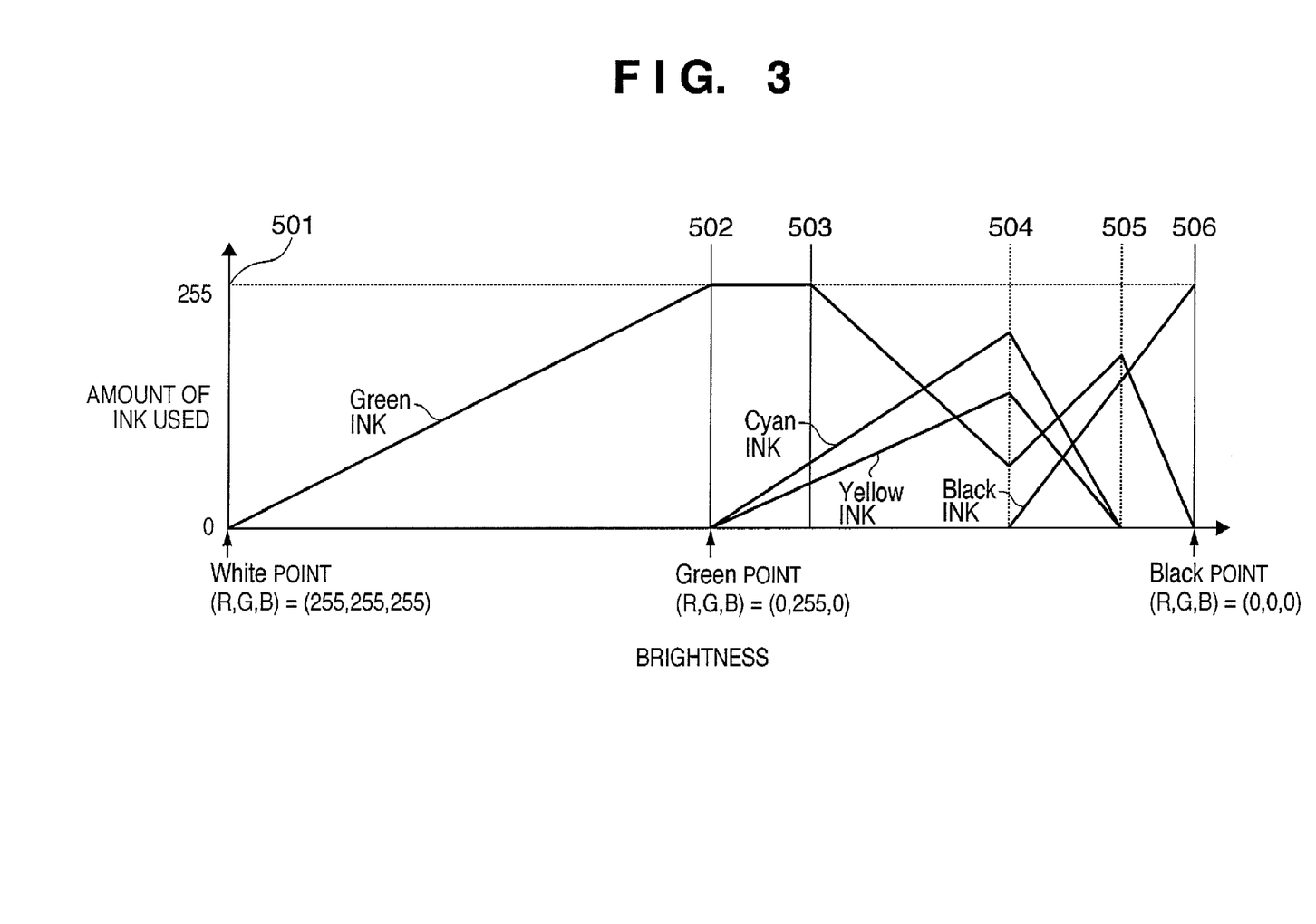
FIG. 3 is a diagram illustrating amount of use of each of G, C, Y, K printing materials according to the first embodiment.

FIG. 3 illustrates amount of use of each of G, C, Y, K printing materials in the G hue as an example of color separation according to this embodiment. The vertical axis in FIG. 3 indicates signal level represented by an 8-bit value. This corresponds to the amount of printing material used (e.g., amount of ink ejected). In FIG. 3, reference numerals 501, 502 and 503 respectively indicate the point of color white (W), which is the maximum brightness for the G hue, a point at which maximum saturation capable of being expressed by the G color material is realized, and a point at which the total amount of color material used has reached its limit. Further, reference numerals 504, 505 and 506 respectively indicate a point at which the amounts of C, Y color materials used peak and use of the K color material starts, a point at which the amounts of C, Y color materials used vanish and saturation of the mixed colors of G and K peak, and the point of color black (K), which is the point of minimum brightness.

Let the region between 501 and 502 shown in FIG. 3, the region between 502 and 503, the region between 503 and 504, the region between 504 and 505 and the region between 505 and 506 be referred to as a high-brightness region, first intermediate-brightness region, second intermediate-brightness region, low-brightness region and near-black region, respectively.

This embodiment is characterized in that a desired gray-level value or gamut is realized by storing color-separation data, which implements the characteristic shown in FIG. 3, at the lattice points of the 3D-LUT shown in FIG. 2. Described below is an example of concrete lattice-point data focusing on the G hue, in a manner similar to FIG. 3, in the 3D-LUT shown in FIG. 2.

First, data (C,M,Y,K,R,G,B)=(0,0,0,0,0,g,0) is placed at a lattice point on the line segment from the white-color lattice point W(R,G,B)=(255,255,255) to the green-color lattice point G(R,G,B)=(0,255,0) shown in FIG. 2. It should be noted that $0 \leq g \leq 255$ holds. These items of data correspond to the high-brightness region (501 to 502) shown in FIG. 3.

Further, data (C,M,Y,K,R,G,B)=(c,0,y,0,0,255,0) expressing a mixed color of G, C, Y is placed at a lattice point on the line segment from the lattice point G(R,G,B)=(0,255,0) to the K(R,G,B)=(0,0,0). It should be noted that $0 \leq c \leq 255$, $0 \leq y \leq 255$ hold. These items of data correspond to the first intermediate-brightness region (502 to 503) shown in FIG. 3.

Here it is assumed that the color-separation data at a brightness (indicated at 504 in FIG. 3) that will be most advantageous for the mixed color of C, Y in terms of the gamut is (C,M,Y,K,R,G,B)=(c',0,y',0,0,g',0), and that $0 < c' < 255$, $0 < y' < 255$, $0 < g' < 255$ holds. Further, data (C,M,Y,K,R,G,B)=(c,0,y,0,0,g,0), $0 < c < c'$, $0 < y < y'$, $g' < g < 255$ is placed at each lattice point corresponding to the second intermediate-brightness region (503 to 504) shown in FIG. 3.

Further, data (C,M,Y,K,R,G,B)=(c,0,y,k,0,g,0), $0 < c < c'$, $0 < y < y'$, $0 < k < 255$, $g' \leq g \leq 255$ is placed at each lattice point corresponding to the low-brightness region (504 to 505) shown in FIG. 3.

Finally, data (C,M,Y,K,R,G,B)=(0,0,0,k,0,g,0), $0 < k < 255$, $0 < g < 255$ is placed at each lattice point corresponding to the near-black region (505 to 506) shown in FIG. 3.

With regard to each hue of C, M, Y, R, B, besides the G hue, data is placed at each lattice point in a manner similar to that of the G hue described above. Further, data can be placed in similar fashion also with regard to hues, which cannot be illustrated simply in FIG. 2, other than the hues of C, M, Y, R, G, B.

That is, the conversion relationship indicated by the 3D-LUT shown in FIG. 2 represents the content of processing for generating the color-separation data in the color separation unit 3. However, the generation of color-separation data in this embodiment is not limited to the form using the 3D-LUT. For example, it is permissible to adopt an arrangement in which computations in accordance with the equations representing the above-described conversion relationship are performed on each occasion and the color separation data is calculated with respect to input RGB data.

Enlargement of gamut using special colors In this embodiment, it is possible to enlarge the gamut by utilizing a special color. Taking a printing material of the special color green (G) as an example, a method of enlarging a gamut by setting color-separation data corresponding to the printing material of the color G at lattice points of a 3D-LUT will be described in detail.

Figure 4:
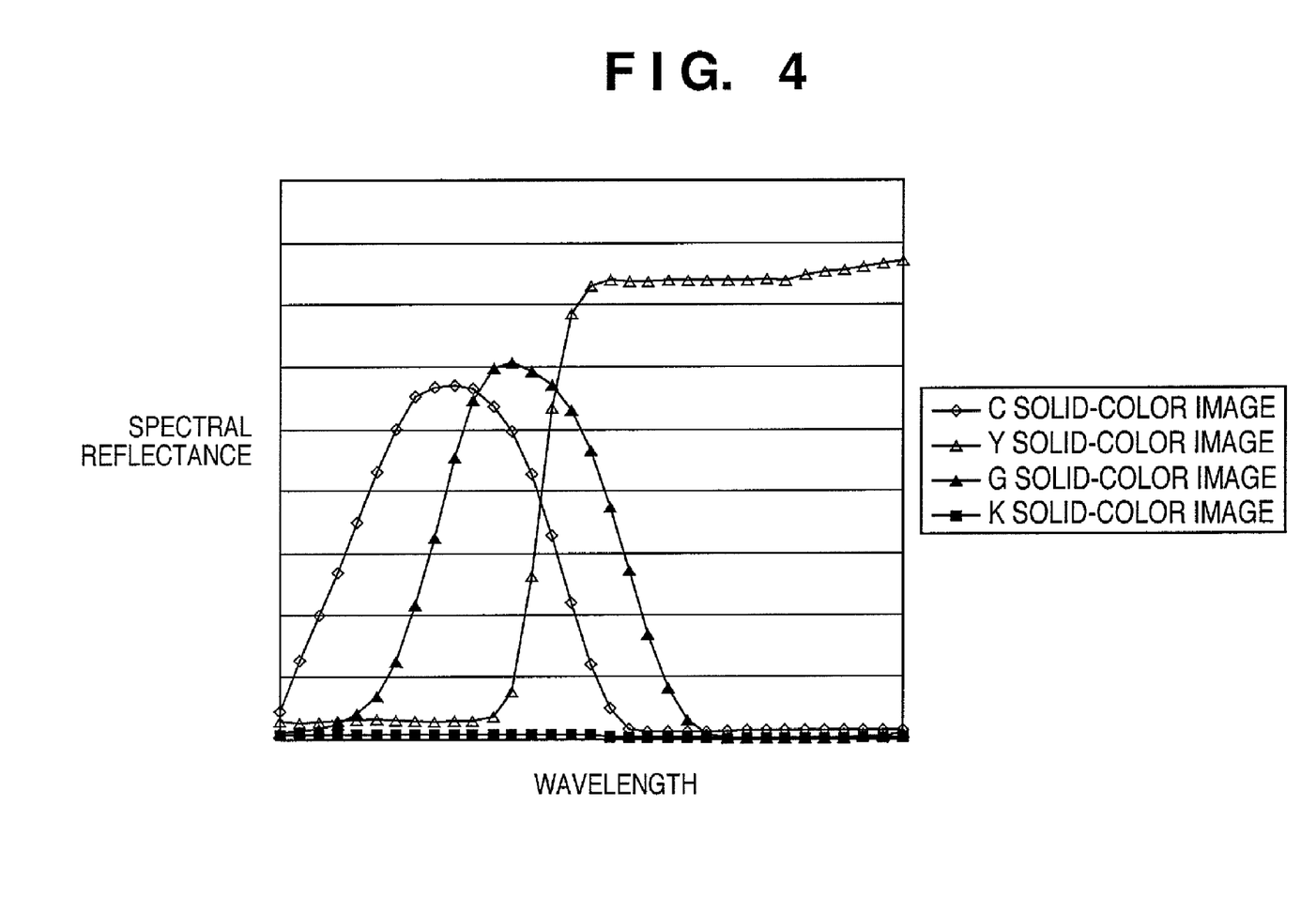
FIG. 4 is a diagram illustrating spectral reflectance factor characteristics of solid color images of G, C, Y in the first embodiment.

FIG. 4 is a diagram illustrating spectral reflectance characteristics with respect to solid color images of G, C, Y and K used in this embodiment. The printing material of the special color G used here is prepared emphasizing the fact that a high saturation is expressed in the high-brightness region. That is, the spectral reflectance of the printing material of the color G has a large peak width while indicating a high peak in the wavelength region of G, as indicated in FIG. 4, and the unwanted absorption component is very small. The term "unwanted absorption component" refers to a reflection component on the outer side of the peak of the spectral reflectance, namely in the wavelength region of red (R) or blue (B) in this case.

Further, the printing materials of the basic colors C, Y are fabricated emphasizing tonality at the time of mixing. That is, the unwanted absorption component is large in comparison with the printing material of the special color G. Further, the printing material of the color K has a very low reflectance uniformly over the entire wavelength region.

Figure 5:
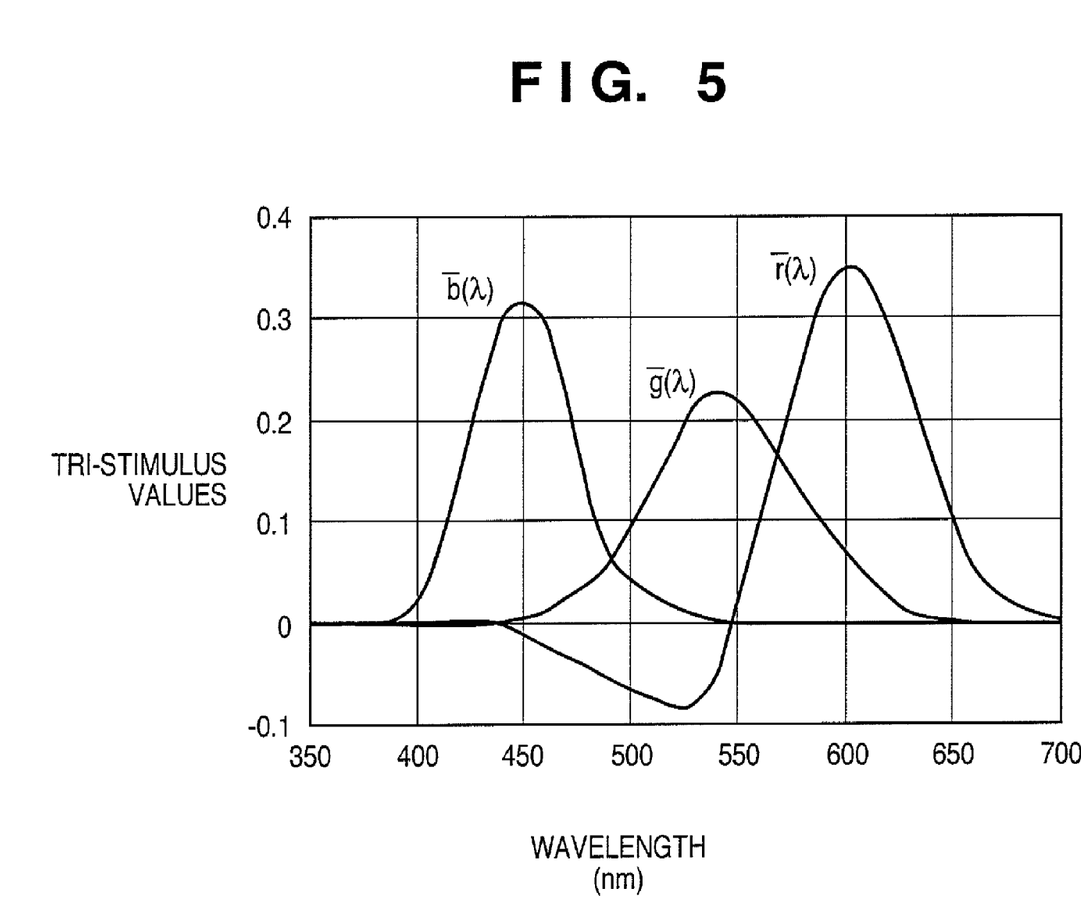
FIG. 5 is a diagram illustrating a color-matching function in the first embodiment.

FIG. 5 is a diagram illustrating a color matching function that represents the characteristic of human vision. The results of multiplying the spectral reflectance of each image by each of the color matching functions of r, g, b shown in FIG. 5 become the tristimulus values of each of the colors R, G, B visually perceived by a human being. Brightness is high if the total of the tristimulus values of each of the colors R, G, B is large and is low if the total is small. Further, the ratio of the tristimulus values decides the hue of the image, and it may be considered that the more there is an offset toward one or two of the tristimulus values (i.e., the lower the ratio occupied by one or two of the tristimulus values), the higher the saturation of the image.

Figure 6:
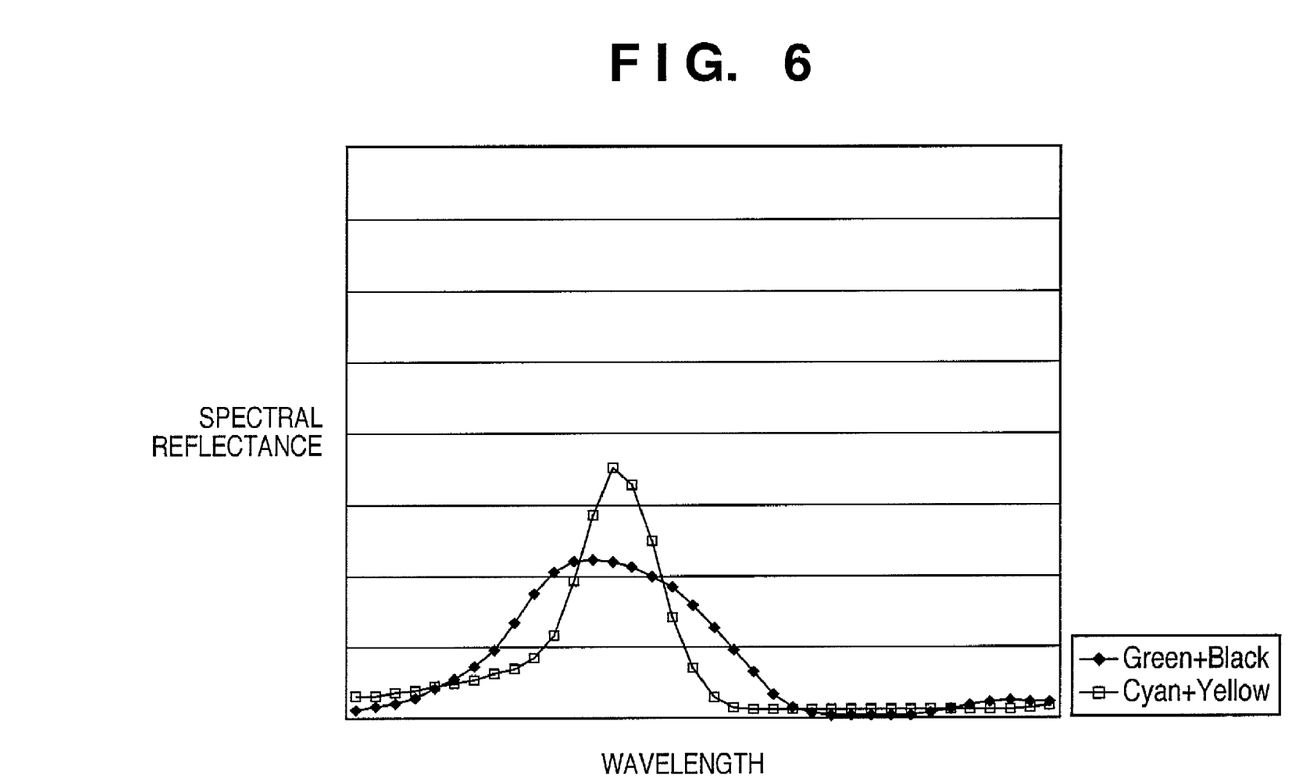
FIG. 6 is a diagram illustrating spectral reflectance characteristics of a G, K mixed-color image and C, Y mixed-color image in an intermediate-brightness region according to the first embodiment.

FIG. 6 is a diagram illustrating spectral reflectance characteristics of a G, K mixed-color image and C, Y mixed-color image in the intermediate-brightness region. Ink of the special color G prepared in such a manner that saturation is high in the high-brightness region has a spectral characteristic with a broad peak width. In the case of an image formed by the mixed colors of C and Y, therefore, a spectral characteristic that is sharp in comparison with the G solid color image of FIG. 4 is obtained, as illustrated in FIG. 6. On the other hand, in the case of an image formed by the mixed colors of C and Y, which are basic colors, prepared emphasizing tonality, the unwanted absorption component in the R, B wavelength region is larger in comparison with when use is made of the G solid color, which is a special color.

In a case where K is mixed with the printing material of the color G to adjust to a brightness the same as that of a C, Y mixed-color image, a G, K mixed-color image having a broad peak width is such that the tristimulus values of R, B are large in comparison with the C, Y mixed-color image. That is, since the tristimulus values of R, B become large at the same brightness, the G, K mixed-color image is such that saturation declines in comparison with the C, Y mixed-color image in the intermediate-brightness region.

Obtaining a sharp spectral characteristic as in the C, Y mixed-color image shown in FIG. 6 is a factor that enhances saturation. On the other hand, the fact that the unwanted absorption component is large increases the tristimulus values of R, B and causes a decline in saturation.

Figure 7:
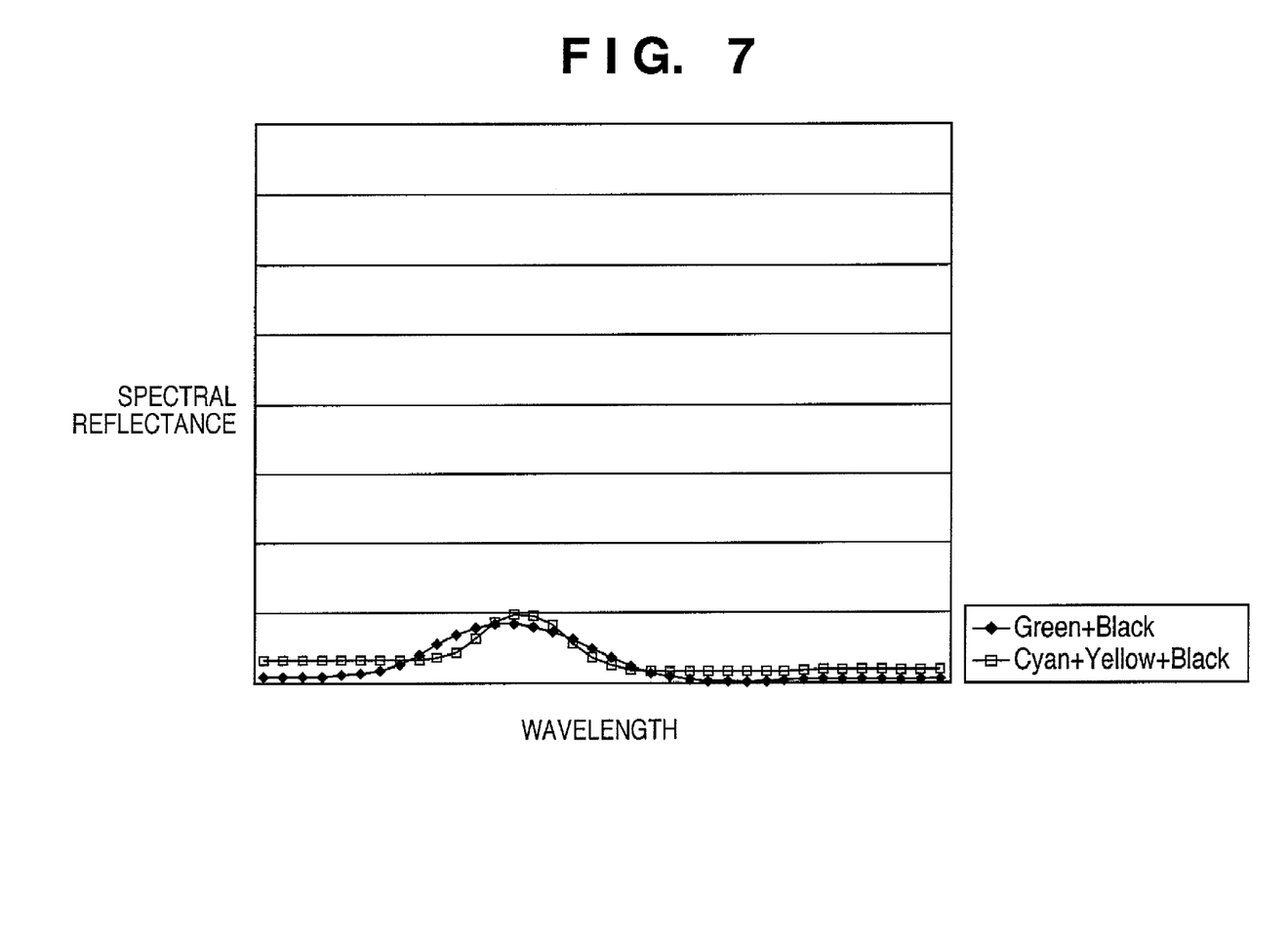
FIG. 7 is a diagram illustrating spectral reflectance characteristics of a G, K mixed-color image and C, Y, K mixed-color image in a near-black region according to the first embodiment.

FIG. 7 is a diagram illustrating spectral reflectance characteristics of a G, K mixed-color image and C, Y, K mixed-color image in the near-black region. In the intermediate-brightness region shown in FIG. 6, the amount of reflected light in the G wavelength region is large. Therefore, the saturation enhancing effect due to the fact that the spectral characteristic is sharp is greater than the saturation reducing effect ascribable to the unwanted absorption component, and a saturation higher than that of the G solid color can be obtained by using the C, Y mixture. However, in the near-black region shown in FIG. 7, the amount of reflected light in the G wavelength region decreases and the difference in saturation ascribable to the peak shape declines. Accordingly, since the saturation reducing effect ascribable to the unwanted absorption component becomes relatively larger in proportion, a higher saturation can be obtained with the mixed-color image of G, K having little unwanted absorption as compared with an image formed by the mixed colors of C, Y, K. In this embodiment, therefore, the mixed colors of G, K are employed, as illustrated in FIG. 3, in the near-black region.

Figure 8:
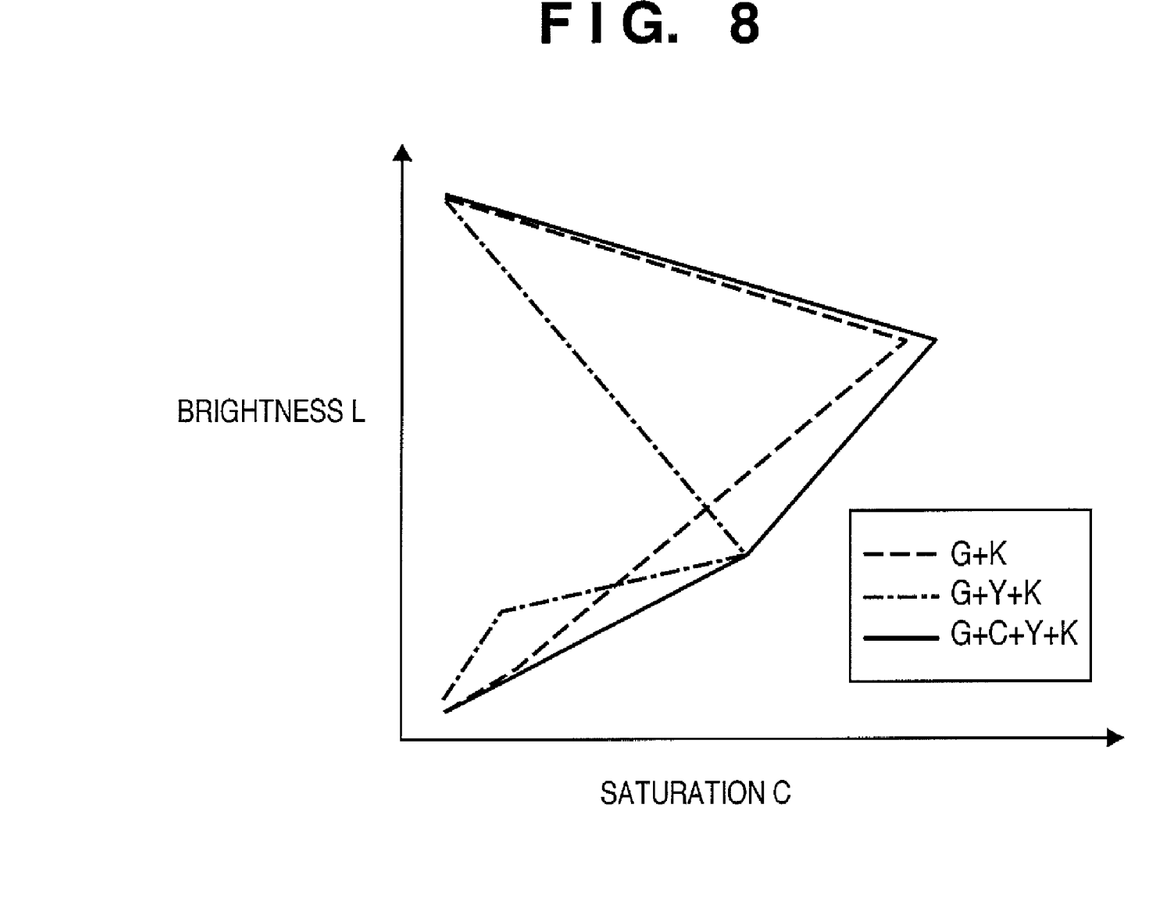
FIG. 8 is a diagram illustrating a color-reproduction range based upon mixed colors in an LCH calorimetric system with regard to a hue of G in the first embodiment.

FIG. 8 is a diagram illustrating a color-reproduction range based upon mixed colors in an LCH colorimetric system with regard to the G hue. The dash line in FIG. 8 indicates the color-reproduction range of G in a case where G, K printing materials are mixed. The dot-and-dash line indicates the color-reproduction range of G in a case where C, Y, K printing materials are mixed. The solid line indicates the color-reproduction range of G in a case where G, C, Y, K printing materials are mixed.

Figure 9:
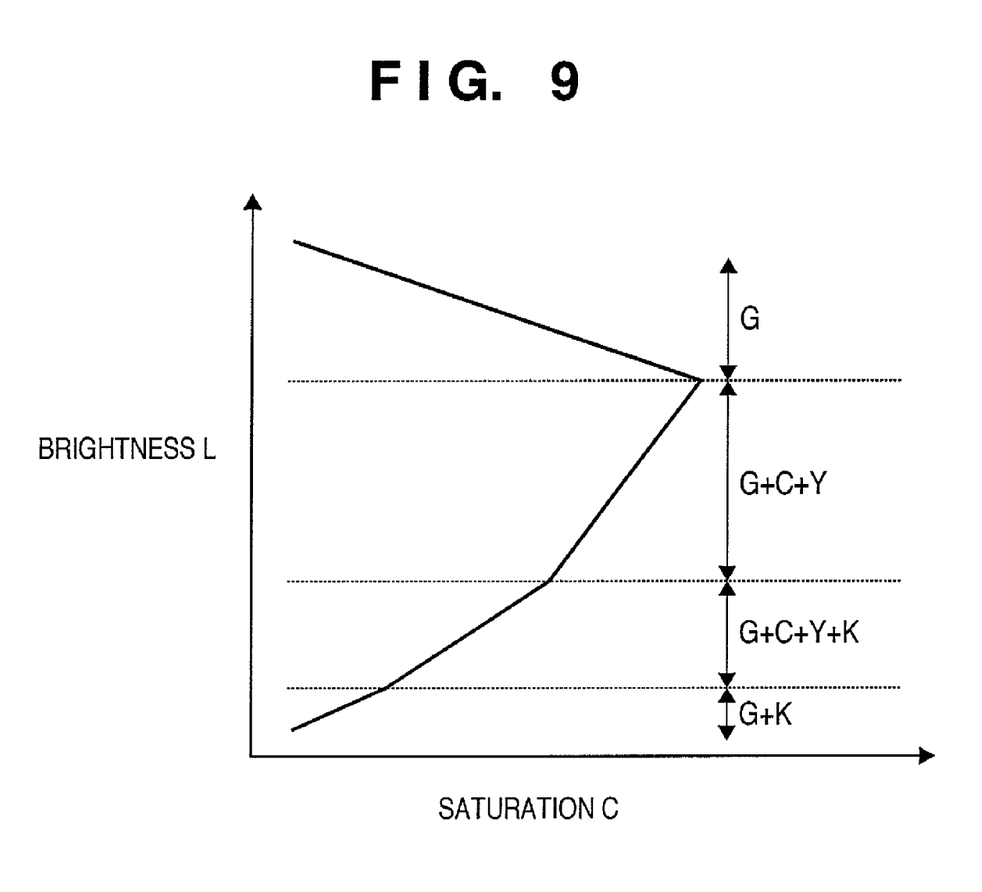
FIG. 9 is a diagram illustrating a combination of basic colors, a special color and black for obtaining a broader color reproduction range with regard to a hue of G in the first embodiment.

FIG. 9 is a diagram illustrating, for every brightness region, a combination of basic colors C, Y, special color G and black K for obtaining a broader color reproduction range in the present invention in relation to the G hue. If the combination of this embodiment shown in FIG. 9 is complied with, a broader color reproduction range will be obtained in the G hue and a high saturation will be obtained over all brightnesses. That is, it is possible to realize the color reproduction range of FIG. 8 in a case where G, C, Y, K are mixed.

The essence of the present invention is that a reproducible gamut is enlarged by deciding an appropriate combination of printing materials for every hue and brightness region. In other words, the combination illustrated in FIG. 9 is one example; even a case where a printing material not shown in FIG. 9 is used in order to improve gamut or another element of image quality falls within the scope of the present invention.

Utilization of Color Material Based Upon Color-Separation Data

In this embodiment, the color-separation data shown in FIG. 3 is used in order to realize the combination of printing materials of FIG. 9 in the G hue. Utilization of special color materials based upon the color-separation data of this embodiment will be described below.

First, only the printing material of the color G is used with regard to the high-brightness region (501 to 503 in FIG. 3) from W(R,G,B)=(255,255,255) indicating the color white to G(R,G,B)=(0,255,0) indicating the pure color green, and the amount of use thereof is changed to perform color reproduction. Accordingly, G(R,G,B)=(0,255,0) indicating the pure color green undergoes color reproduction using only the printing material of the color G.

Next, with regard to the intermediate-brightness region from G(R,G,B)=(0,255,0) indicating the pure color green to K(R,G,B)=(0,0,0) indicating the color black, first the C, Y printing materials that are the adjacent colors of G are added in the first intermediate-brightness region (502-503 in FIG. 3), whereby color reproduction is performed upon lowering brightness. When the total amount of printing material used reaches a limit value, the amount of printing material of the color G used is reduced and the amount of the printing materials of the colors C and Y used is increased in the second intermediate region (503 to 504 in FIG. 3).

Furthermore, if a brightness that will be most advantageous for the color mixture of C, Y in terms of the gamut is reached, then G is added again together with K instead of C, Y in the low-brightness region (504 to 505 in FIG. 3), whereby color reproduction is performed upon lowering brightness.

Furthermore, if saturation based upon the mixed colors of G and K peaks, i.e., the total amount of the printing materials of the colors G and K used reaches the limit value, then the amount of printing material of the color G used is reduced and the amount of the printing material of the color K used is increased in the near-black region (505 to 506 in FIG. 3), whereby black is attained.

Thus, in this embodiment, two basic colors that are adjacent colors of a special color (in this example, C and Y, which are the adjacent colors of the special color G) are used simultaneously in the intermediate-brightness region and low-brightness region, and the mixed color of the special color and K is used in the near-black region. As a result, a gamut can be enlarged in the directions of saturation and brightness, as illustrated in FIGS. 8 and 9. In other words, even if use is made of a color material having a high brightness, a reproducible gamut can be enlarged even with regard to a low-brightness region of a hue of this special color and the near-black region.

It should be noted that the foregoing illustrates an example of enlargement of a gamut in the G hue. However, this embodiment is similarly applicable to hues of other special colors. That is, it is possible for a combination of a special color and a printing material of the K color to express a color having lower brightness and a higher saturation than those of a combination two basic colors, which have adjacent hues, and a printing material of the color K (or complementary color). As a result, a gamut can be enlarged with regard to the hue of this special color.

In accordance with this embodiment, as described above, the generation of color-separation data corresponding to color materials of a plurality of colors that include at least one special color is performed as follows: With regard to the hue of a special color, color reproduction is performed using a color material of the special color with regard to a region of brightness higher than that of a maximum saturation portion based upon the color material of the special color. With regard to an intermediate-brightness region whose brightness is lower than that of a maximum saturation portion based upon the color material of the special color and higher than a brightness that will be most advantageous for saturation that is based upon a mixed color of color materials of two basic colors, color reproduction is performed using a mixed color of color materials of the special color and two basic colors. Furthermore, with regard to a low-brightness region, color reproduction is performed using a mixed color of the special color, two basic colors and K. With regard to the near-black region, which has the lowest brightness, color reproduction is performed using a mixed color of color materials of the special color and K.

Thus, in this embodiment, with regard to a side on which brightness is lower than that of a portion of maximum saturation of the hue of a special color, color-separation data corresponding to the color material of the special color, color-separation data corresponding to color materials of two basic colors having hues nearest to the special color on both sides thereof, and color-separation data corresponding to a color material of the K color is generated taking the spectral characteristics of each of the color materials into consideration. As a result, color material of a special color, color materials of two basic colors whose hues are adjacent to the special color and a color material of the K color can be mixed and adjusted to the hue of the special color and color reproduction having a high saturation over the entire brightness region is possible.

That is, by using a combination of color materials in this embodiment in a region of brightness lower than that of a portion of maximum saturation of the hue of a special color, a reproducible gamut can be enlarged in the directions of saturation and brightness.

It should be noted that in a case where color materials of two basic colors are mixed at a prescribed ratio and adjusted to the hue of a special color, a point on the side of higher saturation can be expressed with respect to a gamut that is expressible by a mixed color of color materials of the special color and K particularly in an intermediate-brightness region in an LC plane indicating the hue of the special color. On the other hand, with regard to the near-black region, a mixed color of materials of the special color and K can express a point on the side of higher saturation with respect to a gamut that is expressible by color materials of two basic colors. In other words, by appropriately selecting a mixed color of two colors whose hues are adjacent to the hue of the special color and a mixed color of the special color and K, a greater gamut enlarging effect can be obtained.

Furthermore, the most preferred arrangement is to prepare two or more color materials of identical hue but different densities with regard to at least one color material of a basic color, special color and K color and generate color-separation data corresponding to these color materials. If this arrangement is adopted, density separation can be performed with regard to a color material of the basic color, special color or K color and graininess can be reduced further.

Further, in this embodiment, an example in which a color material of the K color is used in the low-brightness region and near-black region has been illustrated. However, it is possible to use a color material that is a complementary color of a special color instead.

[Other Embodiments]

Although an embodiment has been described above in detail, it is possible for the present invention to take on the form of a system, apparatus, method, program or storage medium (recording medium). More specifically, the present invention may be applied to a system constituted by a plurality of devices (e.g., a host computer, interface, image sensing device, web application, etc.) or to an apparatus comprising a single device.

Furthermore, the object of the invention is attained also by supplying a software program for implementing the function of the embodiment directly or remotely to a system or apparatus, reading the supplied program codes with a computer of the system or apparatus, and then executing the program codes.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer is connected to a website on the Internet using a browser possessed by the client computer, and the computer program per se of the present invention (or a compressed file containing automatic installation function) is downloaded to a recording medium such as a hard disk. Further, implementation is possible by dividing the program codes constituting the program of the present invention into a plurality of files and downloading the files from different websites. In other words, a WWW server that downloads, to multiple users, the program files that implement the functional processing of the present invention by computer also is included in the present invention.

Further, it is also possible to encrypt and store the program of the present invention on a storage medium such as a CD-ROM, distribute the storage medium to users, and allow users who meet certain requirements to download decryption key information from a website via the Internet. That is, these users are allowed to run the encrypted program by using the key information and to install the program in the user computer.

Further, the functions of the above-described embodiment are implemented by having a computer execute the program that has been read out. An operating system or the like running on the computer can perform all or a part of the actual processing based upon the instructions of the program so that the functions of the foregoing embodiment can be implemented by this processing.

Furthermore, the functions of the foregoing embodiment are implemented even by executing the program, which has been read from the recording medium, after the program read from the recording medium is written to a memory provided on a function expansion board inserted into the computer or provided in a function expansion unit connected to the computer. That is, it is possible for a CPU or the like mounted on the function expansion board or function expansion unit to execute all or a part of the actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-005080, filed Jan. 12, 2007, which is hereby incorporated by reference herein in its <or their, if more than one> entirety.

What is claimed is:

1. An image forming apparatus comprising:
   a conversion unit constructed to convert input color image data into color separation data, which is used for forming a color image on a printing medium using color materials respectively corresponding to cyan, magenta and yellow, which are basic colors, and a color material of a special color; and
   an image forming unit constructed to form a color image based upon the color separation data converted by the conversion unit;
   wherein the color separation data comprises a plurality of color data corresponding to each of the basic color materials of cyan, magenta, yellow, and the color material of the special color,
   wherein a hue of the special color is reproducible by combining a first color material and a second color material, which are selected from among basic colors neighboring the hue of the special color in a color wheel,
   wherein a brightness corresponding to a maximum saturation that is reproducible by the color material of the special color is higher than a brightness corresponding to a maximum saturation that is reproducible by the combination of the first and the second color materials, and
   wherein, regarding the color separation data for the color image at the hue of the special color:
   as a brightness of the input color image data decreases, the value of the color data corresponding to the color material of the special color is increased, decreased and increased again, in that order, and
   as the brightness of the input color image data decreases, the values of the color data corresponding to the first and second color materials is increased and decreased, in that order.

2. The image forming apparatus according to claim 1, wherein
   in the color separation data for the color image at the hue of the special color, as the brightness of the input color image data decreases, the value of the color data corresponding to the color material of the special color is increased in a brightness range between a maximum brightness and the brightness corresponding to the maximum saturation that is reproducible by the color material of the special color.

3. The image forming apparatus according to claim 1, wherein
   the color separation data further comprises color data corresponding to a color material of a black color, and
   regarding the color separation data for the color image at the hue of the special color, as the brightness of the input color image data decreases, the value of color data corresponding to the color material of the black color is increased in a brightness range in which the value of the color data corresponding to the color material of the special color is increased again.

4. The image forming apparatus according to claim 1, wherein the color material of the special color has an unwanted absorption component of spectral reflectance that is smaller than that of a combination of the first and second color materials.

5. The image forming apparatus according to claim 3, wherein when a first compound color, produced by the color material of the special color and the color material of the black color, and a second compound color, produced by the first and second color materials and the color material of the black color, are set to have the same hue and a same brightness, an image formed by the first compound color has an unwanted absorption component of spectral reflectance that is smaller than that of an image formed by the second compound color.

6. The image forming apparatus according to claim 1, wherein the special color is any color from among red, green and blue.

7. A image forming method comprising:
   using one or more processors for converting input color image data into color separation data, which is used for forming a color image on a printing medium using color materials respectively corresponding to cyan, magenta and yellow, which are basic colors, and a color material of a special color; and
   forming a color image based upon the color separation data;
   wherein the color separation data comprises a plurality of color data corresponding to each of the basic color materials of cyan, magenta, yellow and the color material of the special color,
   wherein a hue of the special color is reproducible by combining a first color material and a second color material, which are selected from among basic colors neighboring the hue of the special color in a color wheel, wherein a brightness corresponding to a maximum saturation that is reproducible by the color material of the special color is higher than a brightness corresponding to a maximum saturation that is reproducible by the combination of the first and the second color materials, and wherein, regarding the color separation data for the color image at the hue of the special color:

as a brightness of the input color image data decreases, the value of the color data corresponding to the color material of the special color is increased, decreased and increased again, in that order, and as the brightness of the input color image data decreases, the values of the color data corresponding to the first and second color materials is increased and decreased, in that order.

8. A non-transitory computer-readable storage medium storing a computer program that causes a computer to function as a conversion unit for converting input color image data into color separation data, which is used for forming a color image on a printing medium using color materials respectively corresponding to cyan, magenta and yellow, which are basic colors, and a color material of a special color;

wherein the color separation data comprises a plurality of color data corresponding to each of the basic color materials of cyan, magenta, yellow and the color material of the special color, wherein a hue of the special color is reproducible by combining a first color material and a second color material, which are selected from among basic colors neighboring the hue of the special color in a color wheel, wherein a brightness corresponding to a maximum saturation that is reproducible by the color material of the special color is higher than a brightness corresponding to a maximum saturation that is reproducible by the combination of the first and the second color materials, and wherein, regarding the color separation data for the color image at the hue of the special color:

as a brightness of the input color image data decreases, the value of the color data corresponding to the color material of the special color is increased, decreased and increased again, in that order, and as the brightness of the input color image data decreases, the values of the color data corresponding to the first and second color materials is increased and decreased, in that order.

* * * * *